United States Patent
Sung

(10) Patent No.: US 11,449,381 B2
(45) Date of Patent: Sep. 20, 2022

(54) APPARATUS AND METHOD FOR DIAGNOSING COMMUNICATION FAULT

(71) Applicant: LG Chem, Ltd., Seoul (KR)

(72) Inventor: Yong-Chul Sung, Daejeon (KR)

(73) Assignee: LG Energy Solution, Ltd.

( * ) Notice: Subject to any disclaimer, the term of this patent is extended or adjusted under 35 U.S.C. 154(b) by 371 days.

(21) Appl. No.: 16/626,429

(22) PCT Filed: Nov. 29, 2018

(86) PCT No.: PCT/KR2018/015007
§ 371 (c)(1),
(2) Date: Dec. 24, 2019

(87) PCT Pub. No.: WO2019/124806
PCT Pub. Date: Jun. 27, 2019

(65) Prior Publication Data
US 2020/0133757 A1    Apr. 30, 2020

(30) Foreign Application Priority Data

Dec. 21, 2017 (KR) .......................... 10-2017-0177112

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0739* (2013.01); *H04L 12/40039* (2013.01);
(Continued)

(58) Field of Classification Search
CPC ............... G06F 11/079; G06F 11/0739; H04L 12/40039; H04L 2012/40215; H04L 2012/40273; H04W 84/20
See application file for complete search history.

(56) References Cited

U.S. PATENT DOCUMENTS 10,042,692 B1 * 8/2018 Azad .................... G06F 11/0757
10,078,955 B1 * 9/2018 Gang ................... G06F 11/3089
(Continued)

FOREIGN PATENT DOCUMENTS

JP 2017041693 A 2/2017
JP 2017126858 A 7/2017
(Continued)

OTHER PUBLICATIONS

International Search Report for Application No. PCT/KR2018/015007, dated Mar. 14, 2019, 3 pages.
(Continued)

*Primary Examiner* — Jonathan D Gibson
(74) *Attorney, Agent, or Firm* — Lerner, David, Littenberg, Krumholz & Mentlik, LLP

(57) ABSTRACT

Provided is an apparatus and method for diagnosing a communication fault. The apparatus includes a first slave module, a second slave module and a master module. The first slave module receives a synchronization signal through the first communication line and a first output signal through the second communication line, and transmits an input signal through the third communication line. The second slave module receives synchronization signal through the first communication line, and transmits a comparison signal to the master module through the third communication line when the second slave module receives a second output signal through the second communication line. The master module transmits the synchronization signal, the first output signal and the second output signal, and diagnose a communication fault by comparing a value of the comparison signal with a predetermined reference value or a value of the input signal.

11 Claims, 5 Drawing Sheets

(51) Int. Cl.
*H04L 12/40* (2006.01)
*H04W 84/20* (2009.01)

(52) U.S. Cl.
CPC ... *H04W 84/20* (2013.01); *H04L 2012/40215* (2013.01); *H04L 2012/40273* (2013.01)

(56) References Cited

U.S. PATENT DOCUMENTS

| | | | |
|---|---|---|---|
| 2003/0053547 A1 | 3/2003 | Aberl et al. | |
| 2010/0199009 A1 | 8/2010 | Koide | |
| 2013/0297976 A1* | 11/2013 | McMillen | H04L 43/10 714/43 |
| 2014/0258790 A1* | 9/2014 | Sorenson | H04L 41/0677 714/48 |
| 2014/0300364 A1* | 10/2014 | Choi | H04Q 9/00 324/426 |
| 2014/0343806 A1* | 11/2014 | Kuhnel | G05B 23/0216 701/50 |
| 2015/0160993 A1 | 6/2015 | Park et al. | |
| 2016/0283299 A1* | 9/2016 | Zerdoum | G06F 12/0646 |

FOREIGN PATENT DOCUMENTS

| | | |
|---|---|---|
| KR | 20100083766 A | 7/2010 |
| KR | 20140007600 A | 1/2014 |
| KR | 20140055519 A | 5/2014 |
| KR | 20150067896 A | 6/2015 |
| KR | 20150116557 A | 10/2015 |
| KR | 101613230 B1 | 4/2016 |
| KR | 20160060181 A | 5/2016 |
| KR | 20160073109 A | 6/2016 |
| KR | 101768251 B1 | 8/2017 |
| KR | 20170116377 A | 10/2017 |
| WO | 2014009116 A1 | 1/2014 |

OTHER PUBLICATIONS

Extended European Search Report including Written Opinion for EP18891095.4 dated Sep. 18, 2020; 8 pages.

* cited by examiner

APPARATUS AND METHOD FOR DIAGNOSING COMMUNICATION FAULT

CROSS-REFERENCE TO RELATED APPLICATIONS

The present application is a national phase entry under 35 U.S.C. § 371 of International Application No. PCT/KR2018/015007 filed Nov. 29, 2019, published in Korean, if claiming priority: which claims priority from Korean Patent Application No. 10-2017-0177112, filed Dec. 21, 2017, all of which are incorporated herein by reference.

TECHNICAL FIELD

The present disclosure relates to an apparatus and method for diagnosing a communication fault, and more particularly, to an apparatus and method for diagnosing whether a communication fault is occurred between a master module and a slave module.

BACKGROUND ART

Recently, there is dramatically growing demand for portable electronic products such as laptop computers, video cameras and mobile phones, and with the extensive development of accumulators for energy storage, robots and satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages of free charging and discharging, a very low self-discharge rate and high energy density.

Battery packs are used in various fields, and in many cases, they are used in applications requiring large capacity such as electric-drive vehicles or smart grid systems. To increase the capacity of battery packs, there may be a method that increases the capacity of secondary batteries or battery cells themselves, but in this case, the capacity increase effect is not so large, and there is a physical limitation on the size expansion of the secondary batteries. Accordingly, generally, a battery pack including a plurality of battery modules connected in series and in parallel is widely used.

The majority of battery packs includes a Battery Management System (BMS) to manage a battery module. Further, the BMS monitors the temperature, voltage and current of the battery module, and controls the balancing operation, the cooling operation, the charging operation or the discharge operation of the battery pack based on the monitored state of the battery module. For example, when the battery module includes a plurality of secondary batteries, the BMS measures the voltage of the plurality of secondary batteries, and estimates State Of Charge (SOC) and State Of Health (SOH) of each secondary battery based on the measured voltage of the secondary batteries.

To monitor the battery module and control the cell balancing operation of the battery module based on the monitored state of the battery module, in many cases, the BMS includes slave modules connected to each battery module and a master module that controls the slave modules. In this case, the master module transmits and receives a data signal including the voltage value, current value or temperature value of the battery module through communication connected to the slave module.

FIG. 1 is a diagram for reference in describing a method for diagnosis of communication between the master module and the slave module according to the prior art.

Referring to FIG. 1, the master module 100 may include a plurality of communication terminals. For example, the master module 100 may include a first terminal 101, a second terminal 102, a third terminal 103 and a fourth terminal 104. Additionally, the slave module 200 may include a plurality of communication terminals. For example, the slave module 200 may include a first terminal 201, a second terminal 202, a third terminal 203 and a fourth terminal 204.

The master module 100 may be electrically connected to the plurality of communication terminals 201, 202, 203, 204 of slave module 200 through the plurality of communication terminals 101, 102, 103, 104 to transmit and receive a data signal to/from the slave module 200 using the plurality of communication terminals 101, 102, 103, 104. For example, as shown in the configuration of FIG. 1, the master module 100 may transmit a signal for waking up the slave module 200 from the first terminal 101 to the first terminal 201. Additionally, the master module 100 may transmit a clock signal for activating the data communication operation of the slave module 200 from the second terminal 102 to the second terminal 202. Additionally, the master module 100 may transmit a command signal for requesting the execution of a specific function of the slave module 200 from the fourth terminal 104 to the fourth terminal 204. Additionally, the master module 100 may receive an input signal transmitted by the slave module 200 from the third terminal 203 to the third terminal 103.

In general, during communication between the master module 100 and the slave module 200, when the master module 100 receives data from the slave module 200, a receive buffer (RX buffer) provided in the master module 100 changes from an empty state to a full state.

In the case of the conventional communication diagnosis method, the master module 100 determines the state of the receive buffer provided in the master module 100, and when the receive buffer is full, diagnoses that communication between the master module 100 and the slave module 200 is in a normal state.

However, when a fault occurs in any one of a plurality of communication lines connecting the master module 100 to the slave module 200 or a fault occurs in the slave module 200, the conventional communication diagnosis method is impossible to diagnose a fault in communication between the master module 100 and the slave module 200. In detail, in case that a fault occurs in the communication line or the slave module 200, when the master module 100 generates a clock signal and transmits the generated clock signal to the slave module 200, the receive buffer provided in the master module 100 is changed to the full state, and accordingly, only determining the state of the receive buffer provided in the master module 100 is insufficient to diagnose a fault in communication between the master module 100 and the slave module 200.

DISCLOSURE

Technical Problem

The present disclosure is designed to solve the above-described problem, and therefore the present disclosure is directed to providing an enhanced communication fault diagnosis apparatus and method with improved reliability in diagnosing a fault in communication between a master module and a slave module.

These and other objects and advantages of the present disclosure will be understood by the following description and will be apparent from the embodiments of the present disclosure. Further, it will be readily understood that the objects and advantages of the present disclosure can be realized by the means set forth in the appended claims and combinations thereof.

Technical Solution

An apparatus for diagnosing a communication fault according to one aspect of the present disclosure includes a first slave module connected to each of a first communication line, a second communication line, and a third communication line configured to receive a synchronization signal from a master module through the first communication line, receive a first output signal from the master module through the second communication line, and transmit an input signal to the master module through the third communication line, a second slave module connected to each of the first communication line, the second communication line and the third communication line in parallel with the first slave module, and configured to transmit a comparison signal that is different from the input signal to the master module through the third communication line, and a master module configured to transmit the synchronization signal to the first slave module and the second slave module through the first communication line, transmit a second output signal to the second slave module through the second communication line, and diagnose whether a communication fault is occurred by comparing the input signal with the comparison signal.

The first slave module may be configured to receive the first output signal or transmit the input signal when the first slave module receives the synchronization signal.

The second slave module may be configured to receive the second output signal or transmit the comparison signal when the second slave module receives the synchronization signal.

The master module may be configured to select the first slave module from the first slave module and the second slave module, and transmit the first output signal to the first slave module when the first slave module is selected.

The first slave module may be configured to generate the input signal corresponding to the first output signal and transmit the input signal to the master module when the first slave module receives the first output signal.

The second slave module may be configured to generate the comparison signal corresponding to the second output signal and transmit the comparison signal to the master module when the second slave module receives the second output signal.

The first slave module and the second slave module may be configured to sequentially transmit the input signal and the comparison signal respectively in response to the synchronization signal.

The master module may be configured to compare a value of the input signal and a value of the comparison signal, and diagnose whether the communication fault has occurred based on whether a difference between the value of the input signal and the value of the comparison signal is in a predetermined range.

A battery management system according to another aspect of the present disclosure includes an apparatus for diagnosing a communication fault as described in any of the embodiments herein.

A battery pack according to still another aspect of the present disclosure includes an apparatus for diagnosing a communication fault as described in any of the embodiments herein.

A method according to yet another aspect of the present disclosure is for diagnosing a communication fault between a master module, a first slave module and a second slave module connected through each of a first communication line, a second communication line and a third communication line. The method includes transmitting, by the master module, a synchronization signal to the first slave module and the second slave module through the first communication line, selecting, by the master module, the first slave module from the first slave module and the second slave module and transmitting a first output signal to the first slave module through the second communication line, generating, by the first slave module, an input signal corresponding to the first output signal and transmitting the input signal to the master module through the third communication line when the first slave module receives the synchronization signal and the first output signal, transmitting, by the master module, a second output signal to the second slave module through the second communication line when the master module receives the input signal, generating, by the second slave module, a comparison signal and transmitting the comparison signal to the master module through the third communication line when the second slave module receives the second output signal, and diagnosing, by the master module, whether a communication fault is occurred by comparing the input signal with the comparison signal.

A method according to yet another aspect of the present disclosure is for diagnosing a communication fault between a master module, a first slave module and a second slave module connected through each of a first communication line, a second communication line and a third communication line. The method includes transmitting, by the master module, a synchronization signal to the first slave module and the second slave module through the first communication line, selecting, by the master module, the first slave module from the first slave module and the second slave module, transmitting, by the master module, a first output signal to the first slave module through the second communication line, receiving, by the master module, an input signal from the first slave module through the third communication line in response to the master module transmitting the first output signal and the synchronization signal, transmitting, by the master module, a second output signal to the second slave module through the second communication line, when the master module receives the input signal, receiving, by the master module, a comparison signal from the second slave module through the third communication line, in response to the master module transmitting the second output signal, and diagnosing, by the master module, whether a communication fault has occurred by comparing the input signal with the comparison signal Advantageous Effects According to the present disclosure, the plurality of slave modules sequentially transmits data to the master module. Additionally, the master module may diagnose a fault in communication between the master module and the slave module using the sequentially received data. Accordingly, it is possible to improve the reliability of communication fault diagnosis.

The present disclosure may have a variety of other effects, and these and other effects can be understood by the following description and will be apparent from the embodiments of the present disclosure.

DESCRIPTION OF DRAWINGS

The accompanying drawings illustrate a preferred embodiment of the present disclosure, and together with the following detailed description of the present disclosure, serve to provide a further understanding of the technical aspects of the present disclosure, and thus the present disclosure should not be construed as limited to the drawings.

DETAILED DESCRIPTION

Figure 1:
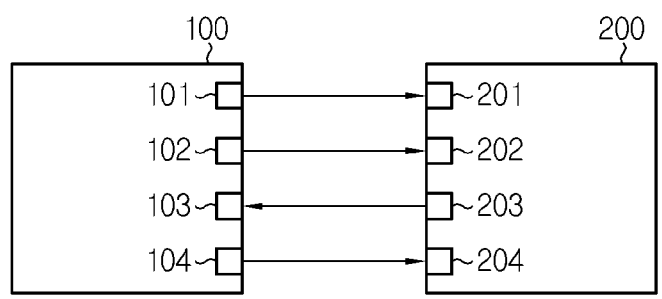
FIG. 1 is a diagram for reference in describing a method for diagnosis of communication between a master module and a slave module according to the prior art.

Hereinafter, the preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and variations could be made thereto at the time of filing the application.

Additionally, in describing the present disclosure, when it is deemed that a detailed description of relevant known elements or functions renders the key subject matter of the present disclosure ambiguous, the detailed description is omitted herein.

Unless the context clearly indicates otherwise, it will be understood that the term "comprises" or "includes" when used in this specification, specifies the presence of stated elements, but does not preclude the presence or addition of one or more other elements. Additionally, the term 'control unit' as used herein refers to a processing unit of at least one function or operation, and this may be implemented in hardware or software alone or in combination.

In addition, throughout the specification, it will be further understood that when an element is referred to as being "connected to" another element, it can be directly connected to the other element or intervening elements may be present.

Figure 2:
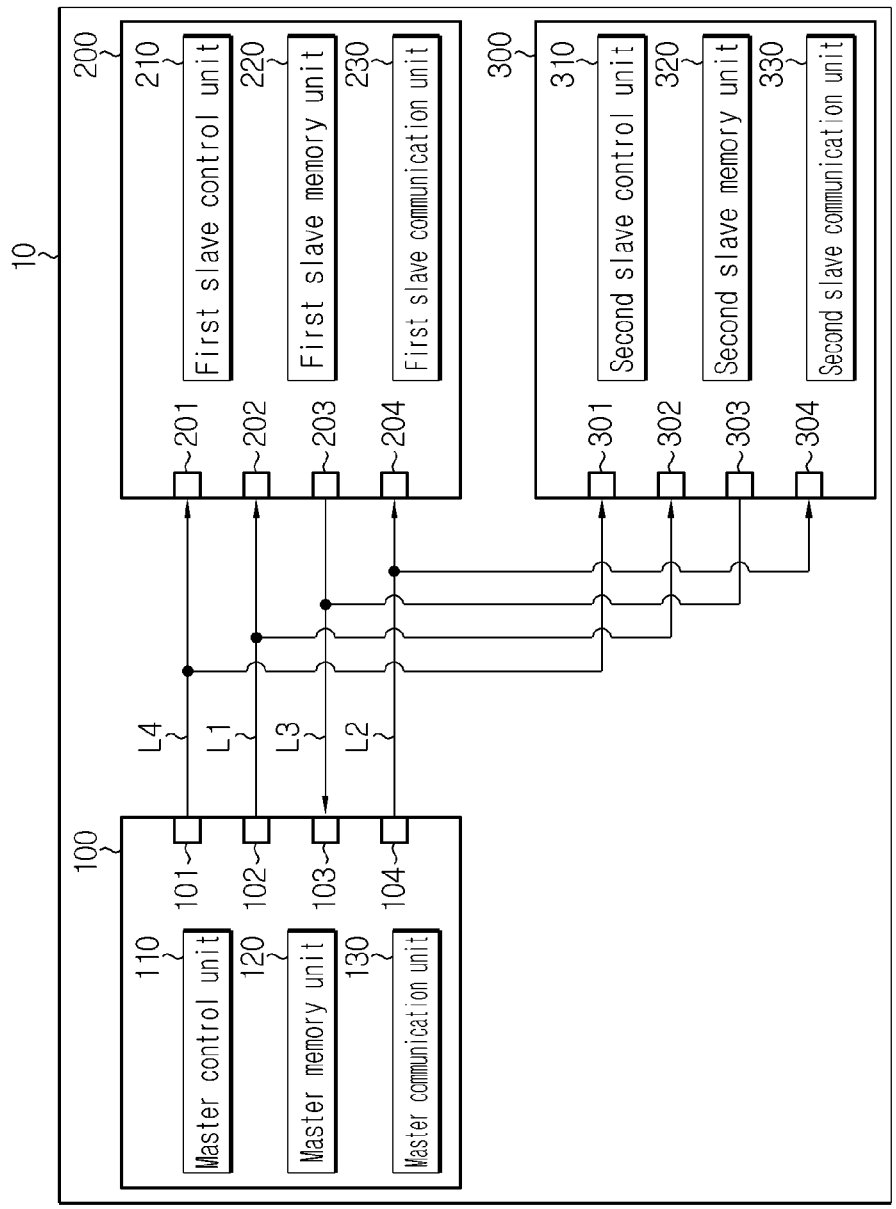
FIG. 2 is a schematic diagram showing the functional configuration of an apparatus for diagnosing a communication fault according to an embodiment of the present disclosure.

FIG. 2 is a schematic diagram showing the functional configuration of an apparatus 10 for diagnosing a communication fault according to an embodiment of the present disclosure.

Referring to FIG. 2, the apparatus 10 for diagnosing a communication fault according to the present disclosure may include a first slave module 200, a second slave module 300 and a master module 100.

The first slave module 200 may be configured to communicate with the master module 100. That is, the first slave module 200 may be electrically connected to the master module 100 to transmit and receive an electrical signal.

The first slave module 200 may communicate with the master module 100 through a first communication line L1, a second communication line L2 and a third communication line L3. That is, the first slave module 200 may be connected to each of the first communication line L1, the second communication line L2 and the third communication line L3 to communicate with the master module 100.

The first communication line L1 may electrically connect the master module 100 to the first slave module 200. Here, the first communication line L1 may be configured to transmit a synchronization signal outputted from the master module 100 to the first slave module 200. That is, the master module 100 may transmit the synchronization signal to the slave modules 200, 300 through the first communication line L1.

The second communication line L2 may electrically connect the master module 100 to the first slave module 200. Here, the second communication line L2 may be configured to transmit an output signal outputted from the master module 100 to the first slave module 200. That is, the second communication line L2 may be configured to transmit the output signal from the master module 100 to the slave modules 200, 300. That is, the master module 100 may transmit the output signal to the slave modules 200, 300 through the second communication line L2.

The third communication line L3 may electrically connect the master module 100 to the first slave module 200. Here, the third communication line L3 may be configured to transmit an input signal outputted from the first slave module 200 to the master module 100. That is, the third communication line L3 may be configured to transmit the input signal from the first slave module 200 to the master module 100. That is, the first slave module 200 may transmit the input signal to the master module 100 through the third communication line L3. The first slave module 200 may transmit the input signal to the master module 100 using a first frequency and a first voltage level pre-allocated to the first slave module 200.

Particularly, each of the first communication line L1, the second communication line L2 and the third communication line L3 may be configured to deliver an electrical signal in only one direction. For example, as shown in the configuration of FIG. 2, the first communication line L1 may be only configured to deliver an electrical signal from the second terminal 102 of the master module 100 to the second terminal 202 of the first slave module 200. Additionally, the second communication line L2 may be only configured to deliver an electrical signal from the fourth terminal 104 of the master module 100 to the fourth terminal 204 of the first slave module 200. Additionally, the third communication line L3 may be only configured to deliver an electrical signal from the third terminal 203 of the first slave module 200 to the third terminal 103 of the master module 100.

As described above, the master module 100 may be electrically connected to the first slave module 200 through the plurality of communication lines L1, L2, L3, L4. For example, when the master module 100 is connected to the first slave module 200 through n communication lines, the master module 100 may be connected to the first slave module 200 through each of the first to $n^{th}$ communication lines. Particularly, each of the first to $n^{th}$ communication lines may be configured to deliver an electrical signal in only one direction. For example, as shown in the configuration of FIG. 2, the fourth communication line L4 may be only configured to deliver an electrical signal from the first terminal 101 of the master module 100 to the first terminal 201 of the first slave module 200.

The master module 100 may be electrically connected to the plurality of slave modules 200, 300. For example, the first slave module 200 may be electrically connected to the master module 100 in parallel with the second slave module 300. For example, as shown in the configuration of FIG. 2, the second slave module 300 may be connected to the master module 100 in parallel with the first communication line L1, the second communication line L2 and the third communication line L3. Preferably, the second slave module 300 may be connected to the master module 100 in parallel with the fourth communication line L4. For example, when the master module 100 is connected to first to $n^{th}$ slave modules, the first to $n^{th}$ slave modules may be each connected to the master module 100 in parallel.

The second slave module 300 may be connected to the master module 100 to diagnose a fault in communication between the master module 100 and the first slave module 200. Particularly, the second slave module 300 may be connected to each of the first communication line L1, the second communication line L2 and the third communication line L3. In detail, the second slave module 300 may be connected to each of the first communication line L1, the second communication line L2 and the third communication line L3 in parallel with the first slave module 200.

Additionally, the second slave module 300 may transmit a comparison signal to the master module 100. The comparison signal may have a predetermined value. The predetermined value may be recognized by the master module 100 only while communication between the master module 100 and the first slave module 200 or the second slave module 300 is normal. For example, when the master module 100 is only configured to recognize that a signal received through the third communication line L3 has a first value (e.g., '0') in case that the third communication line L3 is opened, a value other than the first value may be preset in the second slave module 300 as the predetermined value. In another example, when the master module 100 is only configured to recognize that a signal received through the third communication line L3 has a second value (e.g., '1') in case that the third communication line L3 is shorted, a value other than the second value may be preset in the second slave module 300 as the predetermined value. That is, the predetermined value is a specific value except the first value and the second value, and may be preset. The second slave module 300 may transmit the comparison signal to the master module 100 using a second frequency and a second voltage level pre-allocated to the second slave module 300.

Particularly, the second slave module 300 may transmit, through the third communication line L3, the comparison signal that is different from the input signal transmitted from the first slave module 200 through the third communication line L3. Here, the comparison signal may be transmitted from the second slave module 300 to the master module 100. The input signal and the comparison signal may be signals generated by the first slave module 200 and the second slave module 300 respectively. For example, when the master module 100 and the slave modules 200, 300 are implemented as a Battery Management System (BMS), the input signal may include first data, and the comparison signal may include second data. The first data indicates a voltage value, a current value or a temperature value of a first battery module ('20' in FIG. 3) monitored by the first slave module 200. The second data indicates a voltage value, a current value or a temperature value of a second battery module ('30' in FIG. 3) monitored by the second slave module 300. The first battery module 20 and the second battery module 30 may be electrically connected to each other in series or in parallel.

The master module 100 may transmit the synchronization signal to the plurality of slave modules 200, 300. Here, the synchronization signal is a signal for synchronizing communication between the master module 100 and the slave modules 200, 300. For example, the synchronization signal may be a synchronization clock of Serial Data for Serial Peripheral Interface (SPI) communication between the master module 100 and the slave modules 200, 300.

Particularly, the master module 100 may sequentially transmit the synchronization signal to the first slave module 200 and the second slave module 300. That is, the master module 100 may transmit the synchronization signal to the first slave module 200 and the second slave module 300 with a time interval. For example, the master module 100 may transmit the synchronization signal to the first slave module 200 first, and then transmit the synchronization signal to the second slave module 300. Subsequently, the master module 100 may transmit the synchronization signal to the first slave module 200 again. Subsequently, the master module 100 may transmit the synchronization signal to the second slave module 300, and repeat this process in a predetermined cycle. The predetermined cycle may be pre-stored in the master module 100.

Additionally, the master module 100 may transmit the output signal to the second slave module 300. Particularly, the master module 100 may transmit the output signal to the second slave module 300 to induce the second slave module 300 to output the comparison signal that is different from the input signal received from the first slave module 200. In detail, when the master module 100 receives the input signal from the first slave module 200, the master module 100 may transmit the output signal to the second slave module 300 to induce the second slave module 300 to output the comparison signal having a different value from the value of the received input signal. The value of the input signal may indicate at least one of first identification information, the first frequency and the first voltage level pre-allocated to the first slave module 200. The value of the comparison signal outputted by the second slave module 300 may indicate at least one of second identification information, the second frequency and the second voltage level pre-allocated to the second slave module 300. The first identification information and the second identification information may be different from each other, the first frequency and the second frequency may be different from each other, and the first voltage level and the second voltage level may be different from each other. A difference between the value of the input signal and the value of the comparison signal may be a difference between the first identification information and the second identification information, a difference between the first frequency and the second frequency, or a difference between the first voltage level and the second voltage level. The first identification information and the second identification information may have a type such that a difference between the first identification information and the second identification information can be calculated (e.g., an arrangement of binary numbers).

Accordingly, the difference between the value of the input signal and the value of the comparison signal in a predetermined range may indicate a fault occurred in at least one of the first communication line L1, the second communication line L2, the third communication line L3, the first slave module 200 and the second slave module 300.

Additionally, the master module 100 may be configured to diagnose a fault in communication between the master module 100 and the slave modules 200, 300. Particularly, the master module 100 may be configured to diagnose a communication fault by comparing the input signal and the comparison signal received respectively from the first slave module 200 and the second slave module 300. In detail, the master module 100 may compare the value of the input signal with the value of the comparison signal, and when a difference between the value of the input signal and the value of the comparison signal is in the predetermined range, may diagnose that communication is in a fault state. Meanwhile, the master module 100 may compare the value of the input signal with the value of the comparison signal, and when a difference between the value of the input signal and the value of the comparison signal is outside of the predetermined range, may diagnose that communication is in the normal state.

The first slave module 200 and the second slave module 300 may be configured to receive the output signal from the master module 100 when the first slave module 200 and the second slave module 300 receive the synchronization signal from the master module 100. Subsequently, the first slave module 200 may transmit the input signal to the master module 100 when the first slave module 200 receives the synchronization signal from the master module 100. Additionally, the second slave module 300 may be configured to transmit the comparison signal to the master module 100 when the second slave module 300 receives the synchronization signal from the master module 100. For example, the first slave module 200 and the second slave module 300 may receive the output signal from the master module 100 or transmit the input signal or the comparison signal to the master module 100 only when the first slave module 200 and the second slave module 300 receive the synchronization signal from the master module 100.

Additionally, the master module 100 may be configured to select any one of the first slave module 200 and the second slave module 300, and transmit the output signal to the selected slave module earlier. That is, the master module 100 may generate the output signal including a data transmission request signal, and select a slave module to transmit the generated output signal. Subsequently, the master module 100 may transmit the generated output signal to the selected slave module.

Particularly, the master module 100 may transmit the output signal, i.e., a diagnosis output signal to a target slave module for communication fault diagnosis earlier than other slave modules. For example, to diagnose a communication fault in the first slave module 200, the master module 100 may transmit the diagnosis output signal to the first slave module 200 first. In contrast, to diagnose a communication fault in the second slave module 300, the master module 100 may transmit the diagnosis output signal to the second slave module 300 first. In this case, the master module 100 may transmit a different output signal, i.e., a reference output signal to the first slave module 200 later.

When the slave module 200 or the slave module 300 receives the output signal, i.e., the diagnosis output signal from the master module 100, the slave module 200 or the slave module 300 may be configured to generate the input signal corresponding to the received output signal, and transmit the generated input signal. In detail, when the first slave module 200 receives the output signal from the master module 100, the first slave module 200 may generate the input signal corresponding to the received output signal. In this case, communication of the first slave module 200 is a target for diagnosis. Additionally, the first slave module 200 may transmit the generated input signal to the master module 100. For example, when the first slave module 200 receives the output signal including a request for the voltage value from the master module 100, the first slave module 200 may generate an input signal including the voltage value of the first battery module 20, and transmit the input signal including the voltage value of the first battery module 20 to the master module 100. Additionally, when the second slave module 300 receives the output signal, i.e., the reference output signal including a request of a comparison signal having a different value from the value of the input signal from the master module 100, the second slave module 300 may generate the comparison signal, and transmit the comparison signal to the master module 100. Here, the comparison signal may be reference data for comparison with the input signal from the first slave module 200.

Preferably, the first slave module 200 and the second slave module 300 may be configured to sequentially transmit the input signal and the comparison signal respectively, in response to the synchronization signal sequentially received from the master module 100. In detail, when the first slave module 200 receives the sequentially received synchronization signal, the first slave module 200 may transmit the input signal. Additionally, when the second slave module 300 receives the sequentially received synchronization signal, the second slave module 300 may transmit the comparison signal. For example, the first slave module 200 and the second slave module 300 may sequentially transmit the input signal and the comparison signal respectively. That is, in the apparatus 10, the input signal may be output by the first slave module 200, and subsequently, the comparison signal is output by the second slave module 300.

Particularly, to diagnose a communication fault in the first slave module 200, the master module 100 may sequentially transmit the synchronization signal and the diagnosis output signal to the first slave module 200 first, and when the input signal is received from the first slave module 200, may transmit the synchronization signal and the reference output signal to the second slave module 300 and receive the comparison signal from the second slave module 300.

Additionally, the master module 100 may compare the values of the input signal and the comparison signal received sequentially. For example, the master module 100 may compare the values of the input signal and the comparison signal received respectively from the first slave module 200 and the second slave module 300. Additionally, the master module 100 may be configured to diagnose that communication is in the fault state when a difference between the value of the input signal and the value of the comparison signal is in the predetermined range. The predetermined range may be pre-stored in the master module 100.

In an embodiment of the present disclosure, the master module 100 may receive '0' as the input signal from the first slave module 200. For example, when the first communication line L1, the second communication line L2 or the third communication line L3 is opened, or a fault occurs in the first slave module 200, the master module 100 may receive '0' as the input signal from the first slave module 200. In contrast, when the first communication line L1, the second communication line L2 and the third communication line L3 are in the normal state and the first slave module 200 is in the normal state, the first slave module 200 may actually output '0' as the input signal. Here, for example, when the voltage value is 0V, the first slave module 200 may output '0' as the input signal.

When the master module 100 transmits the output signal to the second slave module 300, the second slave module 300 may output '10' that is different from '0' as the comparison signal. Then, the master module 100 may receive the comparison signal, and compare the value of the input signal with the value of the comparison signal.

For example, when the master module 100 receives '0' as the comparison signal, the master module 100 may compare the value '0' of the input signal with the value '0' of the comparison signal, and diagnose that communication between the master module 100 and the first slave module 200 is in the fault state because a difference between the value of the input signal and the value of the comparison signal is in the predetermined range (e.g., '−0.1~0.1').

Alternatively, when the value of the comparison signal is different from a predetermined reference value, the master module 100 may diagnose that communication between the master module 100 and the first slave module 200 is in the fault state.

Alternatively, when a difference between the value of the input signal and the value of the comparison signal is in the predetermined range and the value of the comparison signal is different from the predetermined reference value, the master module 100 may diagnose that communication between the master module 100 and the first slave module 200 is in the fault state.

Meanwhile, when the master module 100 receives '10' as the comparison signal, the master module 100 may compare the value '0' of the input signal with the value '10' of the comparison signal, and diagnose that communication between the master module 100 and the first slave module 200 is in the normal state because a difference between the value of the input signal and the value of the comparison signal exceeds the predetermined range '−0.1~0.1'.

Alternatively, when the value of the received comparison signal is equal to the predetermined reference value, the master module 100 may diagnose that communication between the master module 100 and the first slave module 200 is in the normal state.

Alternatively, when a difference between the value of the input signal and the value of the comparison signal exceeds the predetermined range and the value of the comparison signal is equal to the predetermined reference value, the master module 100 may diagnose that communication between the master module 100 and the first slave module 200 is in the normal state.

In another embodiment of the present disclosure, the master module 100 may receive '1' as the input signal from the first slave module 200. For example, when the first communication line L1, the second communication line L2 or the third communication line L3 is shorted to a power voltage, the master module 100 may receive '1' as the input signal from the first slave module 200. Additionally, when the first communication line L1, the second communication line L2 and the third communication line L3 are in the normal state, the first slave module 200 may actually output '1' as the input signal. Here, for example, when the voltage value is 1V, the first slave module 200 may output '1' as the input signal. When the master module 100 transmits the output signal to the second slave module 300, the second slave module 300 may output '10' that is different from '1' as the comparison signal. Additionally, the master module 100 may receive the comparison signal, and compare the value of the input signal with the value of the comparison signal.

For example, the master module 100 may receive '1' as the comparison signal, compare the value '1' of the input signal with the value '1' of the comparison signal, and diagnose that communication between the master module 100 and the first slave module 200 is in the fault state because a difference between the value of the input signal and the value of the comparison signal is in the predetermined range (e.g., '−0.1~0.1').

In contrast, the master module 100 may receive '10' as the comparison signal, compare the value '1' of the input signal with the value '10' of the comparison signal, and diagnose that communication between the master module 100 and the first slave module 200 is in the normal state because a difference between the value of the input signal and the value of the comparison signal exceeds the predetermined range (e.g., '−0.1~0.1').

As shown in FIG. 2, the master module 100 may include a master control unit 110, a master memory unit 120 and a master communication unit 130 to perform the operation as described above. The master control unit 110 may generate the synchronization signal. Additionally, the master control unit 110 may generate the output signal. Additionally, the master control unit 110 may diagnose whether a communication fault is occurred by comparing the input signal and the comparison signal. The master memory unit 120 may store the input signal and the comparison signal. Additionally, the master memory unit 120 may store information necessary to generate the output signal and the synchronization signal. The master communication unit 130 may transmit and receive an electrical signal to/from the first slave module 200 and the second slave module 300 through the first communication line L1, the second communication line L2, the third communication line L3 and the fourth communication line L4. Particularly, the master communication unit 130 may sequentially transmit the synchronization signal to the first slave module 200 and the second slave module 300.

As shown in FIG. 2, the first slave module 200 may include a first slave control unit 210, a first slave memory unit 220 and a first slave communication unit 230 to perform the operation as described above. The first slave control unit 210 may generate the input signal. The first slave memory unit 220 may store information necessary to generate the input signal. The first slave communication unit 230 may transmit and receive an electrical signal to/from the master module 100 through the first communication line L1, the second communication line L2, the third communication line L3 and the fourth communication line L4. Particularly, the first slave communication unit 230 may transmit the input signal to the master module 100.

As shown in FIG. 2, the second slave module 300 may include a second slave control unit 310, a second slave memory unit 320 and a second slave communication unit 330 to perform the operation as described above. The second slave control unit 310 may generate the comparison signal.

The second slave memory unit 320 may store information necessary to generate the comparison signal. The second slave communication unit 330 may transmit and receive an electrical signal to/from the master module 100 through the first communication line L1, the second communication line L2, the third communication line L3 and the fourth communication line L4. Particularly, the second slave communication unit 330 may transmit the comparison signal to the master module 100.

The master control unit 110, the first slave control unit 210 and the second slave control unit 310 may be implemented such that they selectively include a processor, an Application-Specific Integrated Circuit (ASIC), a chipset, a logic circuit, a register, a communication modem and/or a data processing device known in the art to perform the operation as described above.

The master memory unit 120, the first slave memory unit 220 and the second slave memory unit 320 are not limited to a particular type and include any storage medium capable of recording and erasing information. For example, the master memory unit 120, the first slave memory unit 220 and the second slave memory unit 320 may be RAM, ROM, register, hard disk, optical recording media or magnetic recording media. The master memory unit 120, the first slave memory unit 220 and the second slave memory unit 320 may be electrically connected to the master control unit 110, the first slave control unit 210 and the second slave control unit 310 respectively through, for example, data bus to allow the master control unit 110, the first slave control unit 210 and the second slave control unit 310 to access respectively. The master memory unit 120, the first slave memory unit 220 and the second slave memory unit 320 may store and/or update and/or erase and/or transmit programs including various types of control logics executed by each of the master control unit 110, the first slave control unit 210 and the second slave control unit 310 and/or data created when the control logics are executed.

The apparatus 10 for diagnosing a communication fault according to the present disclosure may be applied to a BMS. That is, the BMS according to the present disclosure may include the above-described apparatus 10 for diagnosing a communication fault according to the present disclosure. In this configuration, at least some of the components of the apparatus 10 for diagnosing a communication fault according to the present disclosure may be implemented by supplementing or adding the functions of the components included in the conventional BMS. For example, the master module 100, the first slave module 200 and the second slave module 300 of the apparatus 10 for diagnosing a communication fault according to the present disclosure may be included as the components of the BMS.

Additionally, the apparatus 10 for diagnosing a communication fault according to the present disclosure may be provided in a battery pack. That is, the battery pack according to the present disclosure may include the above-described apparatus 10 for diagnosing a communication fault according to the present disclosure. Here, the battery pack may include at least one secondary battery, the above-described apparatus 10 for diagnosing a communication fault, electricals (BMS, relay, fuse, etc.) and a case.

Figure 3:
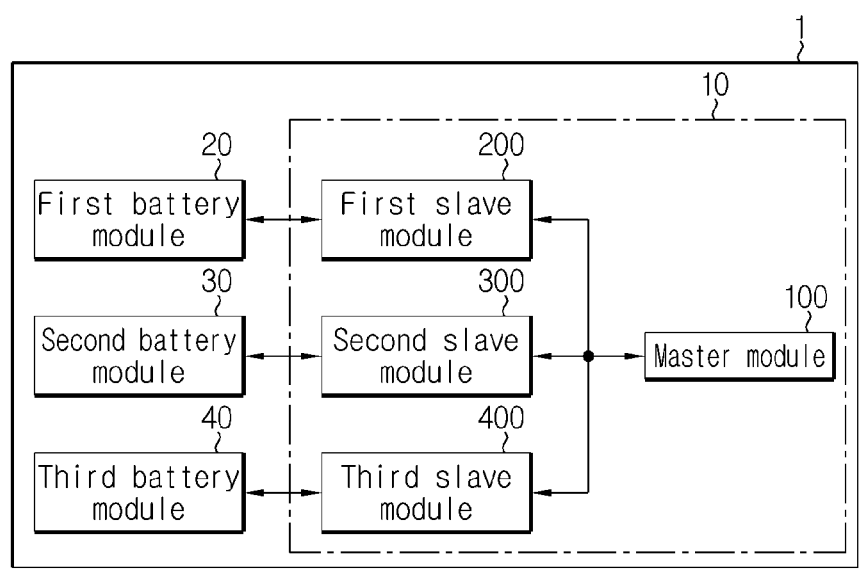
FIG. 3 is a schematic diagram showing parts of an apparatus for diagnosing a communication fault according to an embodiment of the present disclosure applied to a battery pack.

FIG. 3 is a schematic diagram showing parts of the apparatus 10 for diagnosing a communication fault according to an embodiment of the present disclosure applied to the battery pack 1. Difference(s) between this embodiment and the previous embodiment will be primarily described, and a detailed description, to which the description of the previous embodiment may be equally or similarly applied, is omitted herein.

Referring to FIG. 3, the apparatus 10 may be provided in the battery pack 1. In this case, the battery pack 1 may include battery modules 20, 30, 40, a plurality of slave modules 200, 300, 400 and a master module 100. Here, the master module and the slave module according to the present disclosure may be implemented as a master module and a slave module respectively.

In this case, the plurality of slave modules 200, 300, 400 may be connected to the plurality of battery modules 20, 30, 40, and monitor the state of the plurality of battery modules 20, 30, 40 respectively. Here, the state information of the battery modules 20, 30, 40 monitored by the plurality of slave modules 200, 300, 400 may be the voltage value, the current value, the temperature value or the SOC. Additionally, the plurality of slave modules 200, 300, 400 may control the cell balancing process based on the state information of the battery module.

For example, as shown in FIG. 3, the first slave module 200 may be connected to the first battery module 20 to monitor the state of the first battery module 20 and control the cell balancing of the first battery module 20. Additionally, the second slave module 300 may be connected to the second battery module 30 to monitor the state of the second battery module 30 and control the cell balancing of the second battery module 30. Additionally, the third slave module 400 may be connected to the third battery module 40 to monitor the state of the third battery module 40 and control the cell balancing process of the third battery module 40.

The master module 100 may be connected to the plurality of slave modules 200, 300, 400 to control the plurality of slave modules 200, 300, 400. For example, the master module 100 may be connected to the first slave module 200, the second slave module 300 and the third slave module 400 to receive the state information the first battery module 20, the second battery module 30 and the third battery module 40, and control the cell balancing process of the first slave module 200, the second slave module 300 and the third slave module 400 based on the state information the first battery module 20, the second battery module 30 and the third battery module 40.

The apparatus 10 may diagnose a fault in communication between the battery module and the slave module using other slave module connected to the battery module. For example, in the configuration of FIG. 3, the apparatus 10 may diagnose a communication fault in the second slave module 300 or the third slave module 400 using the first slave module 200. Similarly, the apparatus 10 may diagnose a communication fault in the first slave module 200 or the third slave module 400 using the second slave module 300. Similarly, the apparatus 10 may diagnose a communication fault in the first slave module 200 or the second slave module 300 using the third slave module 400.

Through this configuration, the apparatus 10 may diagnose a fault in communication between the master module and the slave module selectively using other slave module that monitors the battery module. Accordingly, it is possible to improve the efficiency and reliability of communication fault diagnosis.

Figure 4:
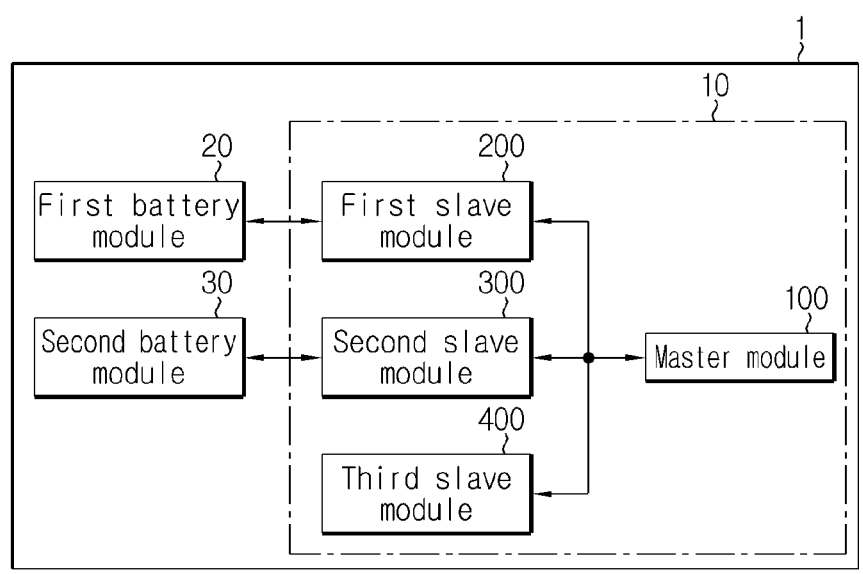
FIG. 4 is a schematic diagram showing parts of an apparatus for diagnosing a communication fault according to another embodiment of the present disclosure applied to a battery pack.

FIG. 4 is a schematic diagram showing parts of the apparatus 10 for diagnosing a communication fault according to another embodiment of the present disclosure applied to the battery pack 1. Here, difference(s) between this embodiment and the previous embodiment will be primarily described, and a detailed description, to which the description of the previous embodiment may be equally or similarly applied, is omitted herein.

Referring to FIGS. 3 and 4, the apparatus 10 may include a slave module for communication diagnosis. Particularly, the slave module for communication diagnosis may only perform the communication diagnosis function without being connected to the battery module. For example, as shown in FIG. 4, the third slave module 400 is the slave module for communication diagnosis, and may be connected to the master module 100, but not the battery modules 20, 30, and diagnoses a communication fault in the first slave module 200 or the second slave module 300.

Through this configuration, the apparatus 10 may diagnose a fault in communication between the master module 100 and the slave modules 200, 300 using another slave module 400 that does not monitor the battery module. Accordingly, it is possible to improve the rate of communication fault diagnosis.

Figure 5:
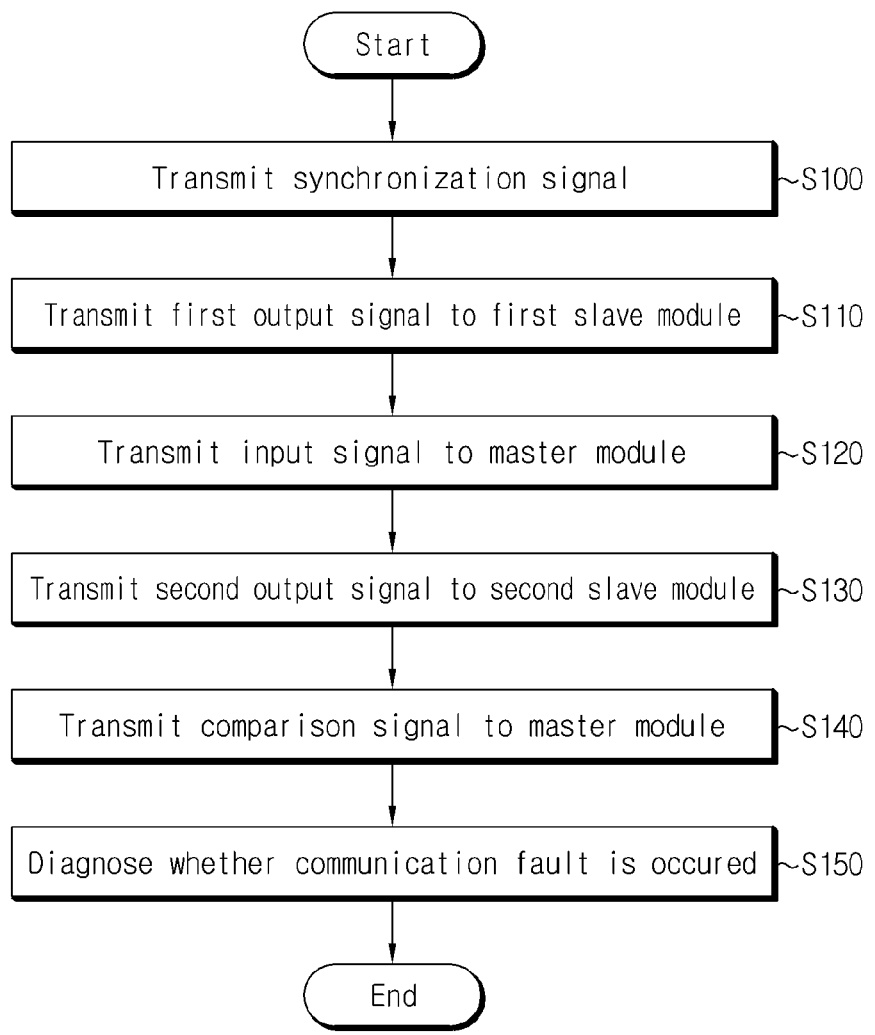
FIG. 5 is a schematic flowchart showing a communication diagnosis method according to an embodiment of the present disclosure.

FIG. 5 is a schematic flowchart showing a communication diagnosis method according to an embodiment of the present disclosure. In FIG. 5, the subject that performs each step may be each component of the apparatus 10 as described above.

As shown in FIG. 5, in step S100, the master module 100 transmits a synchronization signal to the first slave module 200 and the second slave module 300 through the first communication line L1.

Subsequently, in step S110, the master module 100 selects the first slave module 200 from the first slave module 200 and the second slave module 300, and transmits a first output signal to the selected first slave module 200 through the second communication line L2.

Subsequently, in step S120, when the first slave module 200 receives the first output signal and the synchronization signal, the first slave module 200 generates an input signal corresponding to the received first output signal, and transmits the input signal to the master module 100 through the third communication line L3.

Subsequently, in step S130, when the master module 100 receives the input signal from the first slave module 200, the master module 100 transmits a second output signal to the second slave module 300 through the second communication line L2 to induce the second slave module 300 to output a comparison signal that is different from the input signal.

Subsequently, in step S140, when the second slave module 300 receives the second output signal, the second slave module 300 generates a comparison signal, and transmits the comparison signal to the master module 100 through the third communication line L3.

Subsequently, in step S150, the master module 100 diagnoses whether a communication fault is occurred between the master module 100 and the first slave module 200 or the second slave module 300. When it is diagnosed that the communication is occurred, the master module 100 may transmit a first diagnosis message to a user device. When it is diagnosed that the communication fault is not occurred, the master module 100 may transmit a second diagnosis message to the user device.

Additionally, when the control logic is implemented in software, the master control unit, the first slave control unit and the second slave control unit may be implemented as a set of program modules. In this instance, the program module may be stored in a memory device and executed by a processor.

Additionally, there is no particular limitation on the type of control logics of the master control unit, the first slave control unit and the second slave control unit if at least one of various control logics may be combined and the combined control logics may be written in computer-readable coding system to allow the computer to access and read. For example, the recording media includes at least one selected from the group consisting of ROM, RAM, register, CD-ROM, magnetic tape, hard disk, floppy disk and an optical data recording device. Additionally, the coding system may be stored and executed in computers connected via a network in distributed manner Additionally, functional programs, codes and code segments for implementing the combined control logics may be readily inferred by programmers in the technical field to which the present disclosure belongs.

While the present disclosure has been hereinabove described with regard to a limited number of embodiments and drawings, the present disclosure is not limited thereto and various modifications and changes may be made by those skilled in the art within the technical aspects of the present disclosure and the equivalent scope of the appended claims.

Meanwhile, Although the terms 'module' and 'unit' such as 'master module', 'control unit', 'memory unit' and 'communication unit' are used herein, they refer to a logical component unit, and it is obvious to those skilled in the art that the terms do not necessarily indicate components that may or should be physically separated.

What is claimed is:

1. An apparatus for diagnosing a communication fault, comprising:
a first slave module connected to each of a first communication line, a second communication line, and a third communication line, and configured to receive a synchronization signal from a master module through the first communication line, receive a first output signal from the master module through the second communication line, and transmit an input signal to the master module through the third communication line;
a second slave module connected to each of the first communication line, the second communication line and the third communication line in parallel with the first slave module, and configured to transmit a comparison signal that is different from the input signal to the master module through the third communication line; and
a master module configured to transmit the synchronization signal to the first slave module and the second slave module through the first communication line, transmit a second output signal to the second slave module through the second communication line, and diagnose whether a communication fault has occurred by comparing the input signal with the comparison signal.

2. The apparatus for diagnosing a communication fault according to claim 1, wherein the first slave module is configured to receive the first output signal or transmit the input signal when the first slave module receives the synchronization signal.

3. The apparatus for diagnosing a communication fault according to claim 1, wherein the second slave module is configured to receive the second output signal or transmit the comparison signal when the second slave module receives the synchronization signal.

4. The apparatus for diagnosing a communication fault according to claim 1, wherein the master module is configured to select the first slave module from the first slave module and the second slave module, and transmit the first output signal to the first slave module when the first slave module is selected.

5. The apparatus for diagnosing a communication fault according to claim 4, wherein the first slave module is configured to generate the input signal corresponding to the first output signal and transmit the input signal to the master module when the first slave module receives the first output signal, and the second slave module is configured to generate the comparison signal corresponding to the second output signal and transmit the comparison signal to the master module when the second slave module receives the second output signal.

6. The apparatus for diagnosing a communication fault according to claim 1, wherein the first slave module and the second slave module are configured to sequentially transmit the input signal and the comparison signal respectively in response to the synchronization signal.

7. The apparatus for diagnosing a communication fault according to claim 1, wherein the master module is configured to compare a value of the input signal and a value of the comparison signal, calculate a difference between the value of the input signal and the value of the comparison signal, and determine that the communication fault has occurred based on the calculated difference being less than or equal to a predetermined amount.

8. A battery management system comprising the apparatus for diagnosing a communication fault according to claim 1.

9. A battery pack comprising the apparatus for diagnosing a communication fault according to claim 1.

10. A method for diagnosing a communication fault between a master module, a first slave module and a second slave module connected through each of a first communication line, a second communication line and a third communication line, the method comprising:

transmitting, by the master module, a synchronization signal to the first slave module and the second slave module through the first communication line;

selecting, by the master module, the first slave module from the first slave module and the second slave module, and transmitting a first output signal to the first slave module through the second communication line;

generating, by the first slave module, an input signal corresponding to the first output signal, and transmitting the input signal to the master module through the third communication line, when the first slave module receives the synchronization signal and the first output signal;

transmitting, by the master module, a second output signal to the second slave module through the second communication line, when the master module receives the input signal;

generating, by the second slave module, a comparison signal, and transmitting the comparison signal to the master module through the third communication line, when the second slave module receives the second output signal; and diagnosing, by the master module, whether a communication fault has occurred by comparing the input signal with the comparison signal.

11. A method for diagnosing a communication fault between a master module, a first slave module and a second slave module connected through each of a first communication line, a second communication line and a third communication line, the method comprising:

transmitting, by the master module, a synchronization signal to the first slave module and the second slave module through the first communication line;

selecting, by the master module, the first slave module from the first slave module and the second slave module;

transmitting, by the master module, a first output signal to the first slave module through the second communication line;

receiving, by the master module, an input signal from the first slave module through the third communication line in response to the master module transmitting the first output signal and the synchronization signal;

transmitting, by the master module, a second output signal to the second slave module through the second communication line, when the master module receives the input signal;

receiving, by the master module, a comparison signal from the second slave module through the third communication line, in response to the master module transmitting the second output signal; and diagnosing, by the master module, whether a communication fault has occurred by comparing the input signal with the comparison signal.

* * * * *